(12) United States Patent
Urban et al.

(10) Patent No.: US 9,967,026 B2
(45) Date of Patent: May 8, 2018

(54) ARRANGEMENT, SYSTEM AND METHODS THEREIN FOR MONITORING A TRANSMISSION LINE

(71) Applicant: TELEFONAKTIEBOLAGET L M ERICSSON (PUBL), Stockholm (SE)

(72) Inventors: Patryk Urban, Vällingby (SE); Boris Dortschy, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days. days.

(21) Appl. No.: 14/914,063

(22) PCT Filed: Aug. 28, 2013

(86) PCT No.: PCT/SE2013/051007
§ 371 (c)(1),
(2) Date: Feb. 24, 2016

(87) PCT Pub. No.: WO2015/030640
PCT Pub. Date: Mar. 5, 2015

(65) Prior Publication Data
US 2016/0211909 A1    Jul. 21, 2016

(51) Int. Cl.
| H04B 3/46 | (2015.01) |
| H04M 1/24 | (2006.01) |
| H04B 10/077 | (2013.01) |
| H04M 3/30 | (2006.01) |
| H04L 12/26 | (2006.01) |

(52) U.S. Cl.
CPC .......... *H04B 10/0775* (2013.01); *H04B 3/46* (2013.01); *H04M 3/306* (2013.01); *H04L 43/08* (2013.01); *H04M 1/24* (2013.01)

(58) Field of Classification Search
CPC combination set(s) only.
See application file for complete search history.

(56) References Cited

U.S. PATENT DOCUMENTS

| 6,285,475 | B1 | 9/2001 | Fee |
| 7,246,368 | B1 * | 7/2007 | Millet ..................... H04L 43/50 370/241 |
| 8,270,311 | B2 | 9/2012 | Lindqvist et al. |

(Continued)

FOREIGN PATENT DOCUMENTS

| WO | 2006081484 A2 | 8/2006 |
| WO | 2011142741 A1 | 11/2011 |

(Continued)

*Primary Examiner* — David Payne
*Assistant Examiner* — Omar S Ismail

(57) ABSTRACT

A method in an arrangement for monitoring a transmission line to a radio device in a communication network, wherein the transmission line comprises an optical part carrying signals in an optical domain and an electrical part carrying analog information signals in an electrical domain. The arrangement selects a carrier in the electrical part for monitoring the transmission line by assigning a test signal to a subcarrier out of a number of subcarriers of an optical carrier, wherein the subcarrier in the optical domain corresponds to the selected carrier in the electrical domain. Furthermore, the arrangement monitors the transmission line by analyzing a signal, associated with the test signal, received over the assigned subcarrier or another subcarrier.

18 Claims, 7 Drawing Sheets

(56) References Cited

U.S. PATENT DOCUMENTS

| | | | |
|---|---|---|---|
| 2003/0030860 A1* | 2/2003 | Mellert | H04B 10/0773 398/5 |
| 2008/0008417 A1* | 1/2008 | Gilbert | H04B 10/272 385/24 |
| 2008/0140823 A1 | 6/2008 | Thompson et al. | |
| 2010/0014854 A1* | 1/2010 | Healey | H04B 10/077 398/16 |

FOREIGN PATENT DOCUMENTS

| | | |
|---|---|---|
| WO | 2013064272 A1 | 5/2013 |
| WO | 2014137256 A1 | 9/2014 |

* cited by examiner

ARRANGEMENT, SYSTEM AND METHODS THEREIN FOR MONITORING A TRANSMISSION LINE

This application is a 371 of International Application No. PCT/SE2013/051007, filed Aug. 28, 2013, the disclosure of which is fully incorporated herein by reference.

TECHNICAL FIELD

Embodiments herein relate to an arrangement, system and methods for monitoring a transmission line. In particular, embodiments herein relate to monitor a transmission line comprising an optical part and an electric part.

BACKGROUND

In recent years, the use of mobile phones, "smartphones", laptops and tablets for wireless communication of speech and data has grown immensely such that the demands for capacity, performance and flexibility in public cellular networks for radio access have increased dramatically to meet this growth. The capacity of a cellular radio network is dependent on a range of factors such as the number and size of cells, available radio bandwidth, usage of radio resources, configuration of hardware and software, and so forth. For example, small cells may be introduced in addition to a large macro cell to increase capacity locally in limited areas with dense traffic, hence referred to as "hot spots". However, the need for capacity in certain areas may still go beyond the limits of the radio network resulting in unwanted latency as well as dropped or denied connections in the network.

A way of off-loading a public cellular radio network is to provide access points for so-called mobile or wireless broadband and "WiFi" at certain indoor and outdoor locations such as within a building inhabited or visited by terminal users. At such a location, one or more access points with antennas can be installed which are connected to a public fixed network e.g. via modems and routers. For example, the well-known technique of Digital Subscriber Line (DSL) is often used to provide mobile broadband and WiFi to terminal users present in certain limited and well-defined locations such as, a residence, a hotel, an airport, a shopping mall, an office, a building with several apartments, to mention a few examples.

One of the fundamental requirements for mobile backhaul networks connecting multiple user equipment is reliability. This brings up need for a link supervision solution to proactively and reactively monitor link status and quality. For wireline networks, such as copper connection and fiber lines, monitoring is performed using Copper Plant Manager and Fiber Plant Manager Tools. Now, because of the possibility to prolong a copper connection, e.g. Radio-over-Copper (RoCu) with fiber, using a Radio-over-Fiber (RoF) technique, with so called RoCu Reach Extension (RRE), which may be referred to as a Hybrid link, a solution for monitoring such hybrid links is needed.

SUMMARY

An object of embodiments herein is to provide a mechanism to monitor a transmission line, comprising an optical part as well as an electrical part also called hybrid transmission line, in an efficient manner.

The object is achieved, according to embodiments herein, by a method in an arrangement for monitoring a transmission line to a radio device in a communication network. The transmission line comprises an optical part carrying signals in an optical domain and an electrical part carrying analogue information signals in an electrical domain. The arrangement selects a carrier in the electrical part for monitoring the transmission line by assigning a test signal to a subcarrier out of a number of subcarriers of an optical carrier. The subcarrier in the optical domain corresponds to the selected carrier in the electrical domain. The arrangement then monitors the transmission line by analysing a signal, associated with the test signal, received over the assigned subcarrier or another subcarrier.

The object is further achieved, according to embodiments herein, by providing an arrangement for monitoring a transmission line to a radio device in a communication network. The transmission line comprises an optical part carrying signals in an optical domain, and an electrical part carrying analogue information signals in an electrical domain. The arrangement comprises a selecting circuit configured to select a carrier in the electrical part for monitoring the transmission line by assigning a test signal to a subcarrier out of a number of subcarriers of an optical carrier of the optical part. The subcarrier in the optical domain corresponds to the selected carrier in the electrical domain. The arrangement further comprises a monitoring circuit configured to monitor the transmission line by analysing a signal, associated with the test signal, received over the assigned subcarrier or another subcarrier.

Furthermore, the object is achieved, according to embodiments herein, by a method in a system for monitoring a transmission line to a radio device in a communication network. The transmission line comprises an optical part carrying signals in an optical domain and an electrical part carrying analogue information signals in an electrical domain. The system selects at an arrangement a carrier in the electrical part for monitoring the transmission line by assigning the test signal to a subcarrier out of a number of subcarriers of an optical carrier. The subcarrier in the optical domain corresponds to the selected carrier in the electrical domain. The test signal is frequency shifted to an Intermediate Frequency at the arrangement, and transmitted from the arrangement over a fiber line towards a converter. The test signal is photo-detected at the converter. The signal is then shifted to an Intermediate Frequency in the electrical domain at the converter. Furthermore, the shifted test signal is transmitted over the electrical part from the converter towards the radio device, and the converter then receives a signal, associated with the test signal, over the transmission line. The converter converts the received signal to the subcarrier frequency, and sends the converted signal back over fiber line to the arrangement. The arrangement receives the sent signal over the fiber line and monitors the transmission line by analysing the signal received over the assigned subcarrier or another subcarrier.

In addition, the object is achieved by a system for monitoring a transmission line to a radio device in a communication network. The transmission line comprises an optical part carrying signals in an optical domain and an electrical part carrying analogue information signals in an electrical domain. The system is configured to: select, at an arrangement, a carrier in the electrical part for monitoring the transmission line by assigning a test signal to a subcarrier out of a number of subcarriers of an optical carrier, wherein the subcarrier in the optical domain corresponds to the selected carrier in the electrical domain. The system is further configured to frequency shift, at the arrangement, the test signal to an Intermediate Frequency, and also to transmit, from the arrangement, the frequency shifted test signal over a fiber line towards a converter. The system is configured to photo-detect, at the converter, the test signal. The system is in addition configured to shift the signal to an Intermediate Frequency in the electrical domain at the converter, and to transmit the shifted test signal from the converter over the electrical part towards the radio device. The system is further configured to receive a signal, associated with the test signal, over the transmission line at the converter, and also to convert, at the converter, the received signal to the subcarrier frequency. The system is furthermore configured to send the converted signal back from the converter over the fiber line to the arrangement. The system is configured to receive, at the arrangement, the sent signal over the fiber line; and to monitor, at the arrangement, the transmission line by analysing the signal received over the assigned subcarrier or another subcarrier.

An advantage with a solution wherein a test signal is assigned to a subcarrier out of a number of subcarriers of an optical carrier of the optical part, wherein the subcarrier in the optical domain corresponds to a carrier in the electrical domain which is selected for monitoring the transmission line, is that a very efficient way of monitoring one or more parts of the transmission line is provided reusing existent components.

BRIEF DESCRIPTION OF THE DRAWINGS

Embodiments will now be described in more detail in relation to the enclosed drawings, in which.

DETAILED DESCRIPTION

Figure 1:
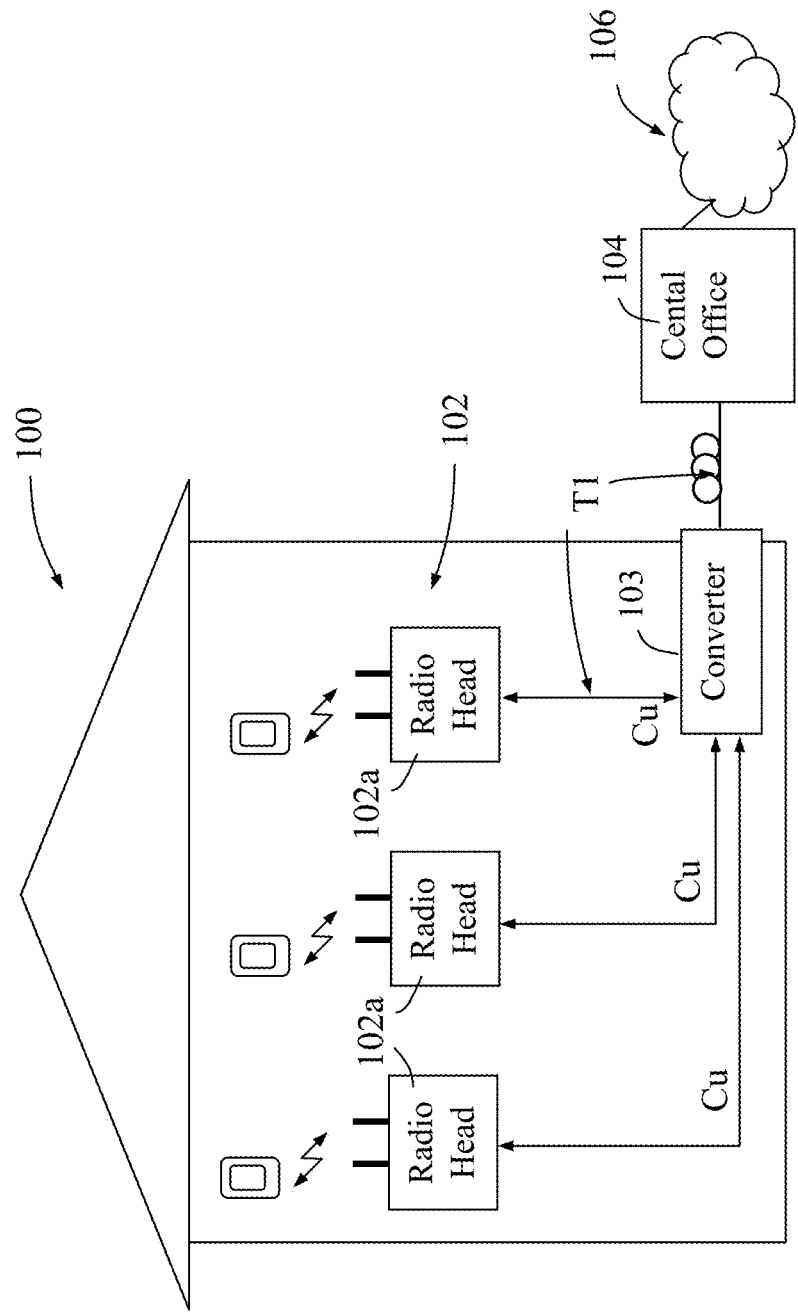
FIG. 1 is a schematic overview depicting an arrangement according to embodiments herein.

FIG. 1 illustrates an arrangement in a local site 100, here illustrated as a building, having multiple access points 102 connected, via copper connections Cu, to a converter 103, or the like, which provides a communication channel via a Central Office (CO) 104 to a public communication network 106 for transport of data packets to and from the public communication network 106. The converter 103 as the CO 104 could be implemented as a router, a gateway, or similar. In this example, three exemplary access points, or radio devices, 102 are shown, each comprising a radio head 102a. The CO 104 is capable of receiving and sending data packets from/to the public communication network 106 and creating a radio signal according to the received data packet and transmitting and receiving the created radio signal to/from the individual radio heads 102a. The converter 103 may be placed in the building's basement, in an adjacent street cabinet, or other fitting space at the local site 100 and may be connected to the public communication network 106 by means of a fiber cable that has been installed for the local site 100. The radio head 102a is a unit that has the function of transferring electric signals in analog form between the respective antenna element and the converter 103. Typically, the high frequency of received radio signals is down-converted to an Intermediate Frequency (IF) by the radio head 102a to minimise media-dependent degradation of signal quality before the signals reach the CO 104, and vice versa. Any coding and decoding of transmitted and received signals, respectively, are made in the CO 104 according to regular procedures, e.g. depending on the radio technology used. In this arrangement, a respective radio unit at the CO 104 with an associated digital unit is required for the access points 102. The "radio unit" may comprise a complete radio base station, e.g. a femto base station, a wifi access point or similar, which is connected to the public communication network 106 via Ethernet, Digital Subscriber Line (DSL), Passive Optical Network (PON), etc. Further, each radio unit is typically "technology-specific" in the sense that it can only handle one certain radio technology, thus allowing communication only with terminals capable of that radio technology.

According to embodiments a solution is herein provided that addresses a single-ended line testing, or a single-ended centralized line testing of hybrid connections i.e. fiber-copper lines using sub-carrier multiplexing in at least some parts. In other words a method in an arrangement of the CO 104 for monitoring a transmission line T1, which comprises both electric and optical lines is herein provided. Subcarrier Multiplexing (SCM) is a potential low cost approach to further reduce complexity of field deployed components by further concentrating Remote Radio Units (RRU) and substitute them with lightweight converter boxes. SCM allows providing several radio signals related to different operators and/or different radio technologies to radio heads with antennas. This brings up the opportunity to assign one of the subcarriers to link monitoring purposes either by using one of the data subcarriers or an idle subcarrier. Embodiments herein disclose an arrangement that performs frequency-shifting, or mixing, signal multiplexing, thus forming the subcarrier based electrical signal, and laser modulation. This device is fed with either an analogue information signal, e.g. radio signal, or a test signal.

According to some embodiments herein a simple media and bandwidth dependent up/down-conversion and routing/multiplexing of test signals is enabled in the converter 103, also called fiber-copper converter box.

Embodiments herein concern measuring or monitoring fiber-copper links with reflectometry techniques.

Figure 2A:
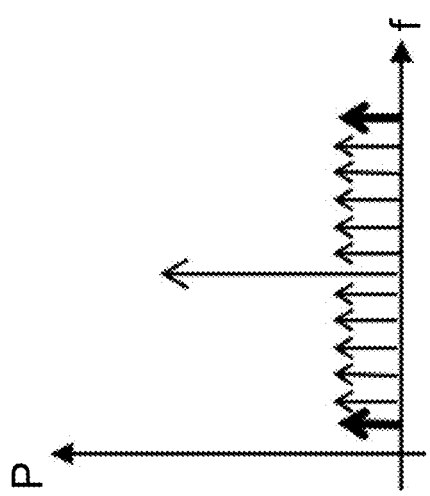
FIGS. 2a-2b are schematic overviews depicting subcarriers to be used to monitor a transmission line according to embodiments herein.
Figure 2B:
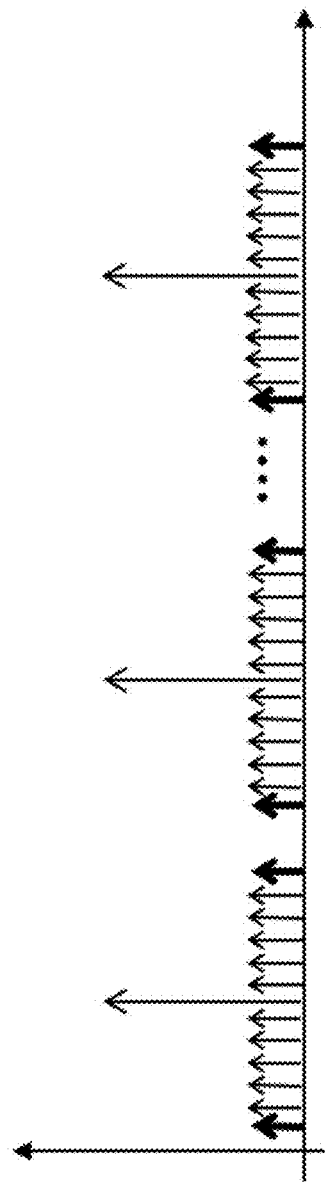

FIG. 2a depicts an example where a single sub-carrier is chosen for monitoring purposes. Because multiplexing of subcarriers takes place on the electrical side, the proposed monitoring approach does not impose any upgrades in the optical domain. The solution will also work for wavelength multiplexed systems such as Wavelength Division Multiplexed (WDM) system where each wavelength channel is loaded with several subcarriers, FIG. 2b. In FIG. 2a a main optical carrier, the long arrow, of a laser or laser diode with a number of subcarriers are shown. The subcarriers used for monitoring may be the end subcarriers, thicker arrows. In FIG. 2b multiple laser diodes are used and the end subcarriers, thicker arrows, are used for test signals. Power P is defined along a vertical axis and frequency f is defined along a horizontal axis.

Figure 3:
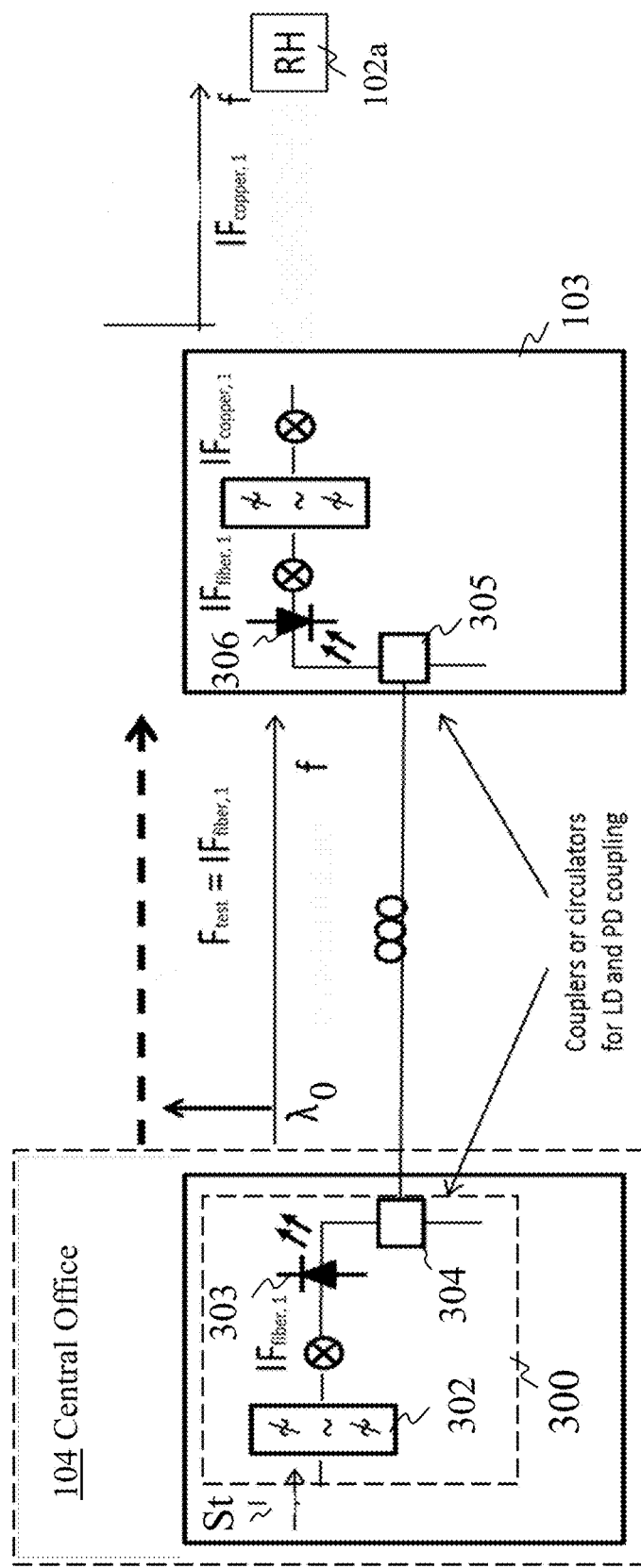
FIG. 3 is a block diagram depicting an arrangement according to embodiments disclosed herein.
Figure 4:
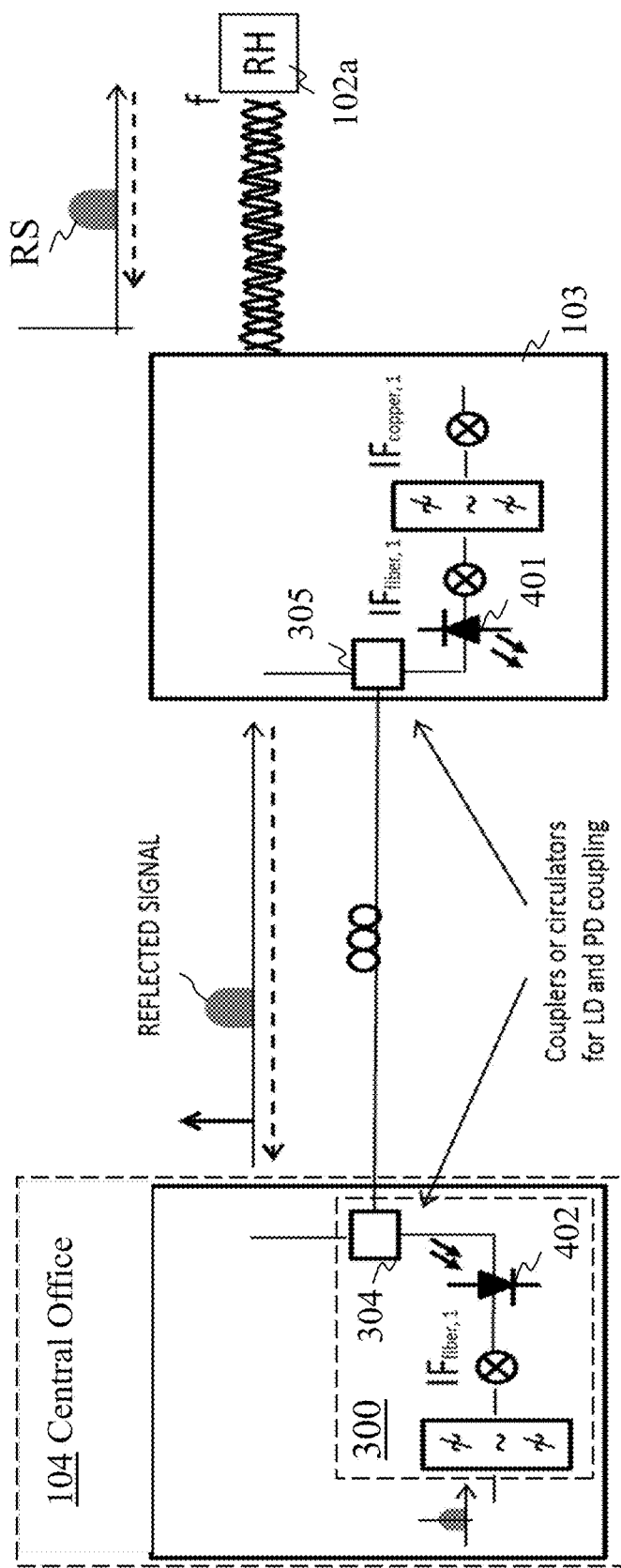
FIG. 4 is a block diagram depicting an arrangement according to embodiments disclosed herein.

According to embodiments herein a Hybrid Single Ended Loop Test (SELT) is using a dedicated subcarrier to test at least part of the transmission line. An example is depicted in FIG. 3 and FIG. 4. SELT is using a signal or a command issued from the Central Office (CO) 104 to test and record the fiber and/or copper metrics of a hybrid local loop. The metrics are based on an analysis of the backscattered signal or the backreflected signal of the transmitted test signal, or actually one or more properties of the backscattered signal or the back-reflected signal compared to one or more properties of the transmitted signal from the CO 104.

In this case a test signal, St, is generated at the CO 104 and fed to an arrangement 300 in the CO 104. The test signal St is passed through an amplifier 302 of the arrangement 300. The test signal St is then mixed or assigned with an Intermediate Frequency, $IF_{fiber,1}$, within the arrangement 300. E.g. the arrangement 300 may comprise a SCM device that is adapted to receive electromagnetic signals on the at least two input ports, to multiplex the electromagnetic signals to a multiplexed electromagnetic signal and to output the multiplexed electromagnetic signal to a laser or laser diode (LD) 303. The laser diode 303 may be adapted to receive the multiplexed electromagnetic signal, to (up) convert the multiplexed electromagnetic signal to optical signals comprising a plurality of sub-carriers of different frequencies distributed in frequency around a main optical carrier, $\lambda_0$, and to output the plurality of wavelengths via a coupler 304 onto the fiber towards the converter 103 or converter box. The test signal St of frequency, $F_{test}$, is thus transmitted over the intermediate frequency, $IF_{fiber, 1}$, of the fiber.

After transmission over the fiber, photo-detection at a coupler 305 and down-conversion at a photo diode (PD) 306 in the converter 103 the signal is shifted from $IF_{fiber,1}$ to IF for copper, $IF_{copper,1}$, transferred via a filtering unit 307 and transmitted over a copper cable or line. That way one can address a given copper line by simply changing the subcarrier frequency at the arrangement 300, which enables single-ended hybrid link monitoring in an efficient manner. The returned, backscattered/back-reflected, signal from the copper line is converted again to the optical subcarrier frequency and sent back over fiber to the arrangement 300. The described subcarrier test signal can be used for testing fiber and copper as signals are always transmitted through the fiber. The monitoring may be used to establish distance to a cut, a spline or a bend, determining attenuation within the transmission line, optical and/or electrical part, or similar.

The IF may be occupied by a data channel for transmitting data, therefore, some embodiments herein use time-windows when given IFs, or selected subcarriers, are available i.e. low traffic demand or antenna off periods. Because the converter 103 and radio heads 102a are very simple linear subsystems with very limited embedded logic it may be needed to put the transmitting antenna down in order to avoid air transmission of the wireline test signals. For that purpose a control channel of a (pre-set) frequency, over the transmission line to radio heads 102a or radio devices, for gain settings or powering of antenna unit or radio head 102a can be used.

The solution is not limited to any particular reflectometry technique and therefore it is assumed that both time-domain as well as frequency-domain reflectometry techniques are applicable.

FIG. 4 discloses a scenario wherein the backreflected/backscattered signal, generated by impurities or bends in the fiber and/or copper, or Reflected Signal (RS), as illustrated, is transmitted back to the arrangement 300. The RS travels over the copper line, or twisted pair of copper line, to the converter 103. The RS is mixed, down converted and filtered to the $IF_{fiber,1}$, and transmitted over the fiber via a laser diode 401 over the coupler 305. The reflected signal is then transmitted over the fiber to the arrangement 300. The arrangement 300 receives the reflected signal via the coupler 304. The RS is then up converted in a photo diode (402). The RS is the down converted to the electrical domain and analysed to determine attenuation, state of the transmission line or the like, based on the RS in the time domain and/or as well as in the frequency domain.

Embodiments herein provide a seamless monitoring solution for hybrid fiber-copper link and are resource-efficient by the reuse of e.g. the SCM technique and with no or minor additional hardware adjustments. Subcarrier Multiplexing (SCM) is a method for combining (multiplexing) many different communications signals so that they can be transmitted along a single optical fiber. SCM is used where the baseband data is first modulated on an electrical subcarrier, which is subsequently modulated on the optical carrier. This way each signal occupies a different portion of the optical spectrum surrounding the center frequency of the optical carrier. At the receiving side, as normally happens in a commercial radio service, the receiver is tuned to the correct subcarrier frequency, filtering out the other subcarriers. The operation of multiplexing and demultiplexing the single subcarriers is carried out electrically. The arrangement 300 analyses the backreflected/backscattered signal which is associated with the test signal. The backreflected/backscattered signal is received over the assigned subcarrier or another subcarrier. In a first case, the signal is reflected on the fiber: the spectrum is more or less identical to the transmit signal; it is therefore received in the same subcarrier together with all the other possible subcarriers as the whole signal is reflected. In a second case, the signal undergoes no considerable reflection along the fiber; it reaches the converter 103; it is photo detected, i.e. undergoes the photo diode, thus being in the electrical domain, where mixing is necessary to adjust to the copper channel as it is lower bandwidth. E.g. a subcarrier at e.g. 500 MHz, relative to the optical carrier, in the optical domain is mixed to, e.g., 50 MHz to be sent over copper. Then, over copper reflections may appear. The reflections result in a signal at low frequencies at the copper receiver side of the converter 103. For this backreflected signal to be further relayed to the arrangement 300 via SCM, choices are: The reflected signal may be mixed "back to the same" IF or subcarrier frequency, e.g., from 50 MHz received at the converter 103 to 500 MHz SCM to be transmitted over the fiber. As up- and downlink over the fiber can be assumed being independent, one could choose any other subcarrier in up-link, for example 1 GHz. Therefore, the subcarrier carrying a signal reflected over copper, in any case, in or after the converter 103, and sent from the converter 103 to the arrangement 300 may have a different frequency than the subcarrier that was used to transmit the test signal to the converter 103. Hence, with the converter 103 in between the arrangement 300 and the radio device 102a, the subcarrier receiving the backreflected/backscattered signal may be the same or one may change it to another subcarrier.

Figure 5:
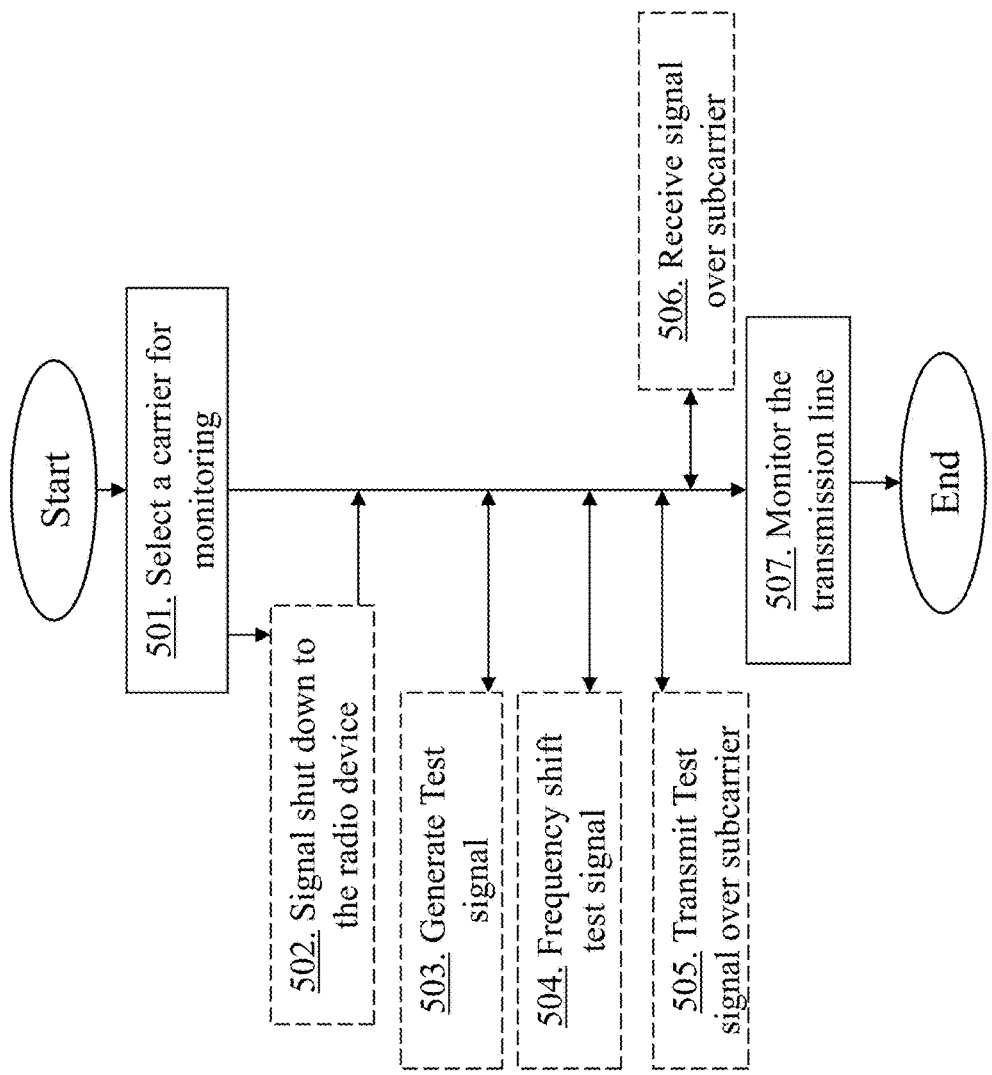
FIG. 5 is a schematic flowchart depicting methods in a baseband unit according to embodiments herein.

The method actions in the arrangement 300 for monitoring a transmission line to a radio device, e.g. access points 102 such as radio heads 102a, in the communication network according to some embodiments will now be described with reference to a flowchart depicted in FIG. 5. The actions do not have to be taken in the order stated below, but may be taken in any suitable order. Actions performed in some embodiments are marked with dashed boxes. The transmission line comprises an optical part carrying signals in an optical domain and an electrical part carrying analogue information signals in an electrical domain.

Action 501. The arrangement 300 selects a carrier in the electrical part for monitoring the transmission line by assigning a test signal to a subcarrier out of a number of subcarriers of an optical carrier in the optical part. The subcarrier in the optical domain corresponds to the selected carrier in the electrical domain.

Action 502. The arrangement 300, in some embodiments, signals shut down to the radio device connected to the transmission line before transmitting the test signal.

Action 503. The arrangement 300 may generate the test signal to be used to monitor the transmission line.

Action 504. The arrangement 300 may further frequency shift the test signal to an Intermediate Frequency.

Action 505. The arrangement 300 may further transmit the test signal over a subcarrier of a fiber line of the optical part. The test signal may be transmitted to the converter 103 connected to the fiber line.

Action 506. The arrangement 300 may also receive the signal associated with the transmitted test signal, such as a backreflected/backscattered signal.

Action 507. The arrangement 300 monitors the transmission line by analysing the signal, associated with the test signal, received over the assigned subcarrier or another subcarrier. The transmission line may be monitored periodically and/or upon report of performance reduction. The received signal may be a backscattered signal or a reflected signal of the transmitted test signal. Both or at least one of the optical part and the electrical part is monitored. The number of subcarriers are subcarriers from a subcarrier multiplexing operation of the optical carrier from a laser diode.

The method may be performed when given Intermediate Frequencies are available e.g. low traffic demand or antenna off periods, that is, when selected carrier is available.

Figure 6:
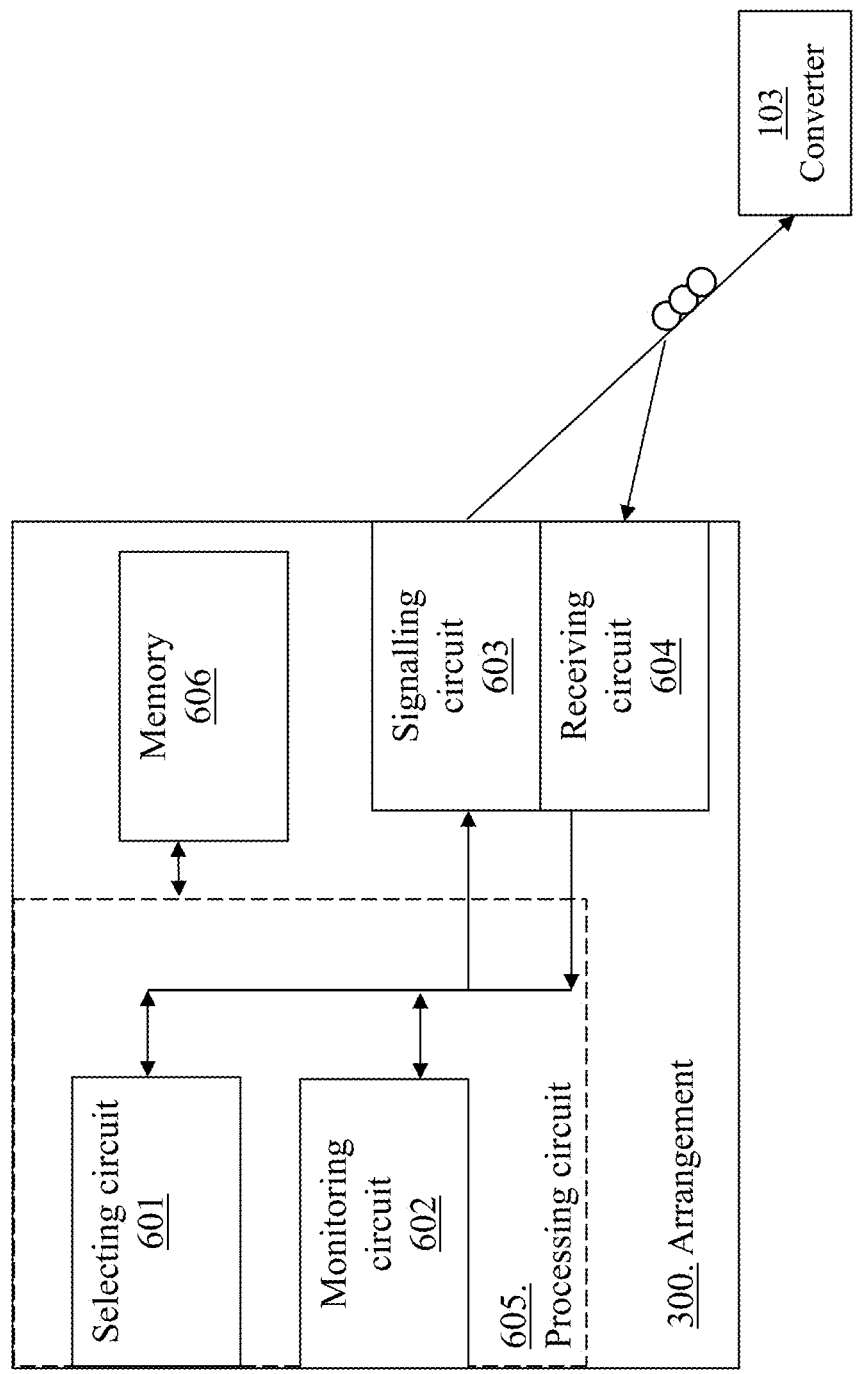
FIG. 6 is a block diagram depicting a base band unit according to embodiments herein.

In order to perform the methods mentioned herein a arrangement 300 is provided. Hence, the arrangement 300 is configured to perform the methods described herein. FIG. 6 is a block diagram depicting the arrangement 300 according to embodiments herein. The arrangement 300 for monitoring a transmission line to a radio device 102, 102a in the communication network 1. The transmission line comprises an optical part carrying signals in an optical domain, and an electrical part carrying analogue information signals in an electrical domain.

The arrangement 300 comprises a selecting circuit 601 configured to select a carrier in the electrical part for monitoring the transmission line by assigning the test signal to a subcarrier out of a number of subcarriers of an optical carrier of the optical part. The subcarrier in the optical domain corresponds to the selected carrier in the electrical domain.

The arrangement 300 further comprises a monitoring circuit 602 configured to monitor the transmission line by analysing a signal, associated with the test signal, received over the assigned subcarrier or another subcarrier. The monitoring circuit 602 may be configured to monitor the transmission line periodically and/or upon report of performance reduction. The received signal may be a backscattered signal or a reflected signal of the transmitted test signal. Both or at least one of the optical part and the electrical part is monitored.

The arrangement 300 may further comprise a signalling circuit 603 configured to signal shut down to the radio device 102, 102a connected to the transmission line before transmitting the test signal. The number of subcarriers are subcarriers from a subcarrier multiplexing operation of the optical carrier from a laser diode. The arrangement 300 may be configured to transmit the test signal to a converter connected to a fiber line.

The arrangement 300 may be configured to perform the monitoring when given Intermediate Frequencies are available or when selected carrier in the electrical part is available. The arrangement 300 comprises a receiving circuit 604, which may be a part of the signalling circuit 603 or a separate unit, configured to receive e.g. the signal associated with the test signal.

The embodiments herein for monitoring the transmission line may be implemented through one or more processing circuits 605, such as a processor, in the arrangement 300 depicted in FIG. 6, together with computer program code for performing the functions and/or method actions of the embodiments herein. The program code mentioned above may also be provided as a computer program product, for instance in the form of a data carrier carrying computer program code for performing embodiments herein when being loaded into the arrangement 300. One such carrier may be in the form of a CD ROM disc. It is however feasible with other data carriers such as a memory stick. The computer program code may furthermore be provided as pure program code on a server and downloaded to the arrangement 300.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Figure 7:
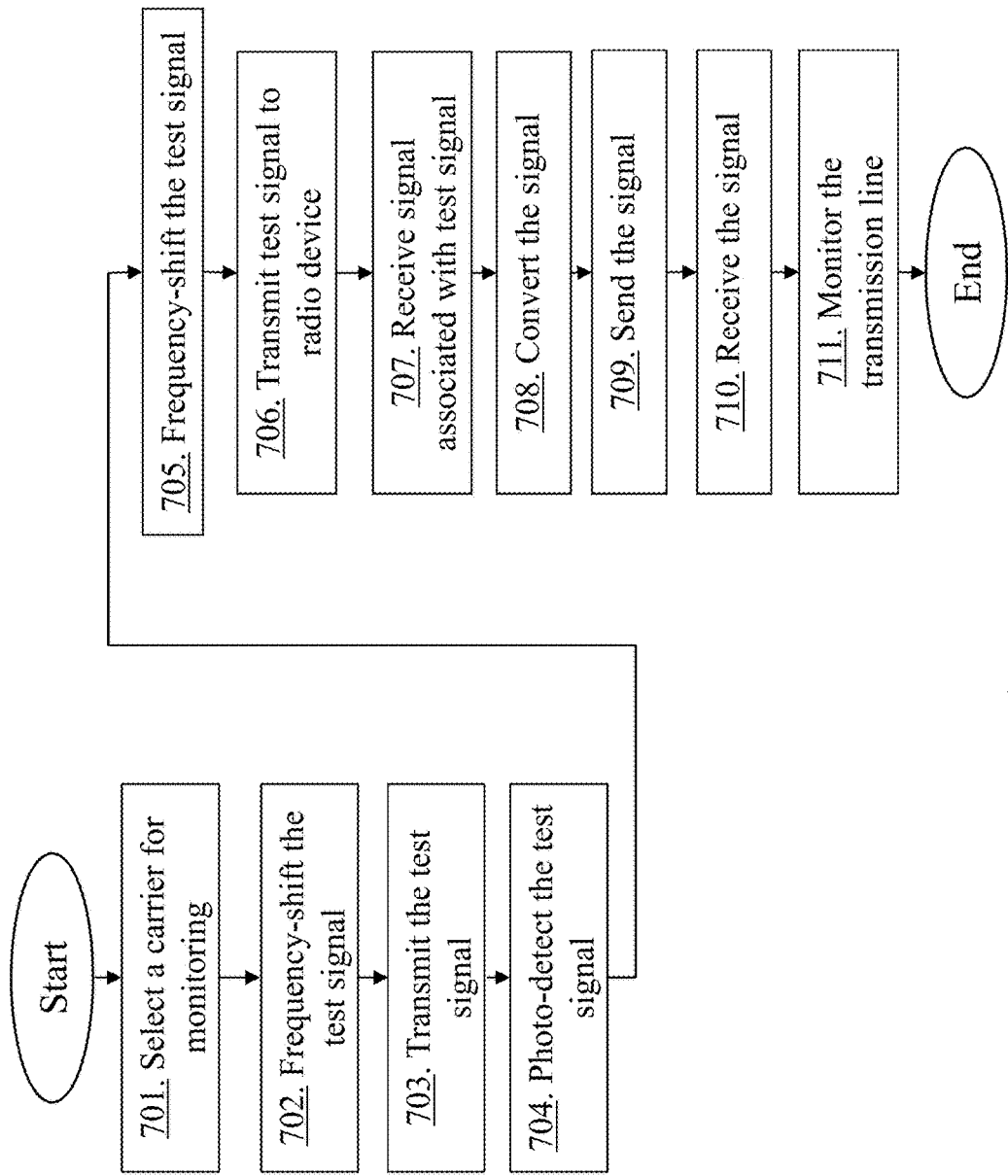
FIG. 7 is a schematic flowchart depicting a method in a system according to embodiments herein.

The method actions in a system for monitoring a transmission line to the radio device 102, 102a in the communication network according to some embodiments will now be described with reference to a flowchart depicted in FIG. 7. The actions do not have to be taken in the order stated below, but may be taken in any suitable order. Actions performed in some embodiments are marked with dashed boxes.

The transmission line comprises an optical part carrying signals in an optical domain and an electrical part carrying analogue information signals in an electrical domain.

Action 701. The system selects at the arrangement 300 a carrier in the electrical part for monitoring the transmission line by assigning the test signal to a subcarrier out of a number of subcarriers of an optical carrier. The subcarrier in the optical domain corresponds to the selected carrier in the electrical domain.

Action 702. The system frequency shifts the test signal to an Intermediate Frequency at the arrangement 300.

Action 703. The arrangement 300 transmits the frequency shifted test signal over a fiber line towards the converter 103.

Action 704. The converter 103, in the system, photo-detects the test signal.

Action 705. The converter 103 frequency shifts the photo-detected test signal to the Intermediate Frequency in the electrical domain.

Action 706. The converter 103 further transmits the shifted test signal over the electrical part towards the radio device 102,102a in the system.

Action 707. The converter 103 receives a signal, associated with the test signal, over the transmission line, e.g. a backscattered or back-reflected signal over the copper line.

Action 708. The converter 103 converts the received signal to a subcarrier frequency. The subcarrier may generally be different as the converter 103 can receive on one and send on another one.

Action 709. The converter 103 then sends the converted signal back over the fiber line to the arrangement 300 in the system.

Action 710. The arrangement 300 receives the sent signal over the fiber line. If the received signal is from reflection on the fiber part, it is naturally on the same subcarrier frequency.

Action 711. The arrangement 300 monitors the transmission line by analysing the signal received over the assigned subcarrier or another subcarrier, or by signalling the result to a different arrangement within the system.

In order to perform the method a system is provided for monitoring the transmission line to a radio device 102, 102a in the communication network 1. The transmission line comprises an optical part carrying signals in an optical domain and an electrical part carrying analogue information signals in an electrical domain. Referring back to FIGS. 1, 3 and 4, the system is configured to:

- select, at the arrangement 300, a carrier in the electrical part for monitoring the transmission line by assigning a test signal to a subcarrier out of a number of subcarriers of an optical carrier, wherein the subcarrier in the optical domain corresponds to the selected carrier in the electrical domain;
- frequency shift, at the arrangement 300, the test signal to an Intermediate Frequency,
- transmit, from the arrangement 300, the frequency shifted test signal over a fiber line towards the converter 103;
- photo-detect, at the converter 103, the test signal;
- shift the photo-detected test signal to an Intermediate Frequency in the electrical domain at the converter 103;
- transmit the shifted test signal from the converter 103 over the electrical part towards the radio device 102, 102a;
- receive a signal, associated with the test signal, over the transmission line at the converter 103;
- convert, at the converter 103, the received signal to a subcarrier frequency;
- send the converted signal back from the converter 103 over the fiber line to the arrangement 300;
- receive, at the arrangement 300, the sent signal over the fiber line; and to
- monitor, at the arrangement 300, the transmission line by analysing the signal received over the assigned subcarrier or another subcarrier.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in a network arrangement for monitoring a hybrid transmission line to a radio device in a communication network comprising:
    selecting a carrier in the electrical part for monitoring the hybrid transmission line, wherein the hybrid transmission line comprises an optical part carrying signals in an optical domain and an electrical part carrying analogue information signals in an electrical domain, by assigning a test signal to a subcarrier out of a number of subcarriers of an optical carrier, wherein the subcarrier in the optical domain corresponds to the selected carrier in the electrical domain, the test signal transmitted over the optical part and the electrical part of the hybrid transmission line toward the radio device, wherein the test signal is converted from the optical part to the electrical part by frequency-shifting the test signal to an Intermediate Frequency in the electrical domain and transmitted over the electrical part; and
    monitoring the hybrid transmission line by analysing a return signal, associated with the test signal, received over the assigned subcarrier or another subcarrier.

2. The method according to claim 1, wherein the hybrid transmission line is being monitored periodically and/or upon report of performance reduction.

3. The method according to claim 1, further comprising:
    signalling shut down to the radio device connected to the hybrid transmission line before transmitting the test signal.

4. The method according to claim 1, wherein the received signal is a backscattered signal or a reflected signal of the transmitted test signal.

5. The method according to claim 1, wherein both or at least one of the optical part and the electrical part is monitored.

6. The method according to claim 1, wherein the number of subcarriers are subcarriers from a subcarrier multiplexing operation of the optical carrier from a laser diode.

7. The method according to claim 1, wherein the test signal is transmitted to a converter connected to a fiber line.

8. The method according to claim 1, wherein the method is performed when selected carrier in the electrical part is available.

9. An arrangement for monitoring a hybrid transmission line to a radio device in a communication network, wherein the arrangement comprises:
    a selecting circuit configured to select a carrier in the electrical part for monitoring the hybrid transmission line, wherein the hybrid transmission line comprises an optical part carrying signals in an optical domain and an electrical part carrying analogue information signals in an electrical domain, by assigning a test signal to a subcarrier out of a number of subcarriers of an optical carrier of the optical part, wherein the subcarrier in the optical domain corresponds to the selected carrier in the electrical domain, the test signal transmitted over the optical part and the electrical part of the hybrid transmission line toward the radio device;
    a converter configured to convert the test signal from the optical part to the electrical part by frequency-shifting the test signal to an Intermediate Frequency in the electrical domain and transmitting the test signal over the electrical part; and a monitoring circuit configured to monitor the hybrid transmission line by analysing a signal, associated with the test signal, received over the assigned subcarrier or another subcarrier.

10. The arrangement according to claim 9, wherein the monitoring circuit is configured to monitor the hybrid transmission line periodically and/or upon report of performance reduction.

11. The arrangement according to claim 9, further comprising:
a signalling circuit configured to signal shut down to the radio device connected to the hybrid transmission line before transmitting the test signal.

12. The arrangement according to claim 9, wherein the received signal is a backscattered signal or a reflected signal of the transmitted test signal.

13. The arrangement according to claim 9, wherein both or at least one of the optical part and the electrical part is monitored.

14. The arrangement according to claim 9, wherein the number of subcarriers are subcarriers from a subcarrier multiplexing operation of the optical carrier from a laser diode.

15. The arrangement according to claim 9, configured to transmit the test signal to the converter connected to a fiber line.

16. The arrangement according to claim 9, configured to perform the monitoring when selected carrier in the electrical part is available.

17. A method in a system for monitoring a transmission line to a radio device in a communication network, wherein the transmission line comprises an optical part carrying signals in an optical domain and an electrical part carrying analogue information signals in an electrical domain; comprising:
selecting, at an arrangement, a carrier in the electrical part for monitoring the transmission line by assigning a test signal to a subcarrier out of a number of subcarriers of an optical carrier, wherein the subcarrier in the optical domain corresponds to the selected carrier in the electrical domain;
frequency-shifting the test signal to an Intermediate Frequency at the arrangement,
transmitting from the arrangement the frequency shifted test signal over a fiber line towards a converter;
photo-detecting the test signal at the converter;
frequency-shifting the test signal to an Intermediate Frequency in the electrical domain at the converter;
transmitting the shifted test signal over the electrical part from the converter towards the radio device;
receiving a signal, associated with the test signal, over the transmission line at the converter;
converting the received signal to a subcarrier frequency at the converter;
sending the converted signal back over the fiber line to the arrangement from the converter;
receiving, at the arrangement, the sent signal over the fiber line; and
monitoring the transmission line by analysing the signal received over the assigned subcarrier or another subcarrier.

18. A system for monitoring a transmission line to a radio device in a communication network, wherein the transmission line comprises an optical part carrying signals in an optical domain and an electrical part carrying analogue information signals in an electrical domain; wherein the system is configured to:
select, at an arrangement, a carrier in the electrical part for monitoring the transmission line by assigning a test signal to a subcarrier out of a number of subcarriers of an optical carrier, wherein the subcarrier in the optical domain corresponds to the selected carrier in the electrical domain;
frequency shift, at the arrangement, the test signal to an Intermediate Frequency,
transmit, from the arrangement, the frequency shifted test signal over a fiber line towards a converter;
photo-detect, at the converter, the test signal;
shift the test signal to an Intermediate Frequency in the electrical domain at the converter;
transmit the shifted test signal from the converter over the electrical part towards the radio device;
receive a signal, associated with the test signal, over the transmission line at the converter;
convert, at the converter, the received signal to a subcarrier frequency;
send the converted signal back from the converter over the fiber line to the arrangement;
receive, at the arrangement, the sent signal over the fiber line; and
monitor, at the arrangement, the transmission line by analysing the signal received over the assigned subcarrier or another subcarrier.

* * * * *